United States Patent [19]

Yu

[11] Patent Number: 4,994,289

[45] Date of Patent: Feb. 19, 1991

[54] AGING OF ALCOHOLIC BEVERAGES

[76] Inventor: Qi-Hai Yu, 301, 3rd Building, Gangzhongcun, Hefei Iron and Steel Company, Hefei, Anhui Province, China

[21] Appl. No.: 423,179

[22] Filed: Oct. 18, 1989

Related U.S. Application Data

[63] Continuation-in-part of Ser. No. 238,798, Aug. 30, 1988, abandoned.

[30] Foreign Application Priority Data

Aug. 31, 1987 [CN] China ............... 87105894.4

[51] Int. Cl.⁵ ............................................. C12H 1/22
[52] U.S. Cl. ................................. 426/330.4; 426/423; 426/592
[58] Field of Search ............... 426/330.4, 423, 422, 426/442, 592; 99/277.1, 277.2

[56] References Cited

U.S. PATENT DOCUMENTS

| | | |
|---|---|---|
| 818,478 | 4/1906 | Shwayder . |
| 2,017,235 | 10/1935 | Drew ............................... 202/79 |
| 2,086,073 | 7/1937 | Francescon . |
| 2,088,337 | 7/1937 | Plume ........................... 99/277.2 |
| 2,108,661 | 2/1938 | Farrier . |
| 2,132,435 | 6/1934 | Reiman . |
| 2,135,622 | 11/1938 | Nagle ............................. 99/277.1 |
| 2,196,193 | 4/1940 | Chambers . |
| 2,663,745 | 12/1953 | Wilson ............................ 426/423 |
| 3,021,780 | 2/1962 | Bobbe ............................ 99/277.1 |
| 3,222,180 | 12/1965 | Sucietto . |
| 3,942,423 | 3/1976 | Herzfeld ........................ 99/277.1 |
| 4,073,955 | 2/1978 | Koppelman ................... 426/422 |
| 4,173,656 | 11/1979 | Duggins ......................... 426/422 |
| 4,558,639 | 12/1985 | Hojnoski ....................... 99/277.1 |
| 4,576,824 | 3/1986 | Gubiev . |
| 4,738,858 | 4/1988 | Mukouyama .................. 426/592 |
| 4,889,743 | 12/1989 | Tazawa ......................... 426/330.4 |
| 4,891,236 | 1/1990 | Ohta .............................. 426/330.4 |

Primary Examiner—Carolyn Paden
Attorney, Agent, or Firm—Ward Brown; Robert W. Beach

[57] ABSTRACT

An alcoholic beverage is confined in a containment vessel having an internal wall of inorganic material (glass, stone, ceramic, enamel, cement, metal) exposed to the beverage. The vessel contains additional interfacing elements of inorganic material so as to increase the surface area of the solid-beverage interface which has been found to irreversibly artificially accelerate the process of aging of the alcoholic beverage.

16 Claims, 2 Drawing Sheets

AGING OF ALCOHOLIC BEVERAGES

CROSS REFERENCE

This application is a continuation-in-part of my copending U.S. patent application Ser. No. 238,798, filed Aug. 30, 1988, now abandoned, titled Technology and Equipment Using Interfacing Method for the Aging of Alcoholic Beverages, which is expressly incorporated by reference herein.

BACKGROUND OF THE INVENTION

1. Field of the Invention

The present invention relates to equipment and a method for accelerated aging of alcoholic beverages.

2. Prior Art

Some alcoholic beverages such as distilled alcoholic beverages do not appeal to the pallet without aging. "Natural" aging can take several years. For example, natural aging for the famous Chinese liquor Xi-feng requires three years. Mao-tai liquor requires three to five years for natural aging. Some varieties of French cognac are said to have been aged for a century.

Various methods have been proposed for the aging of alcoholic beverages. The devices and methods of the following patents are representative:

U.S. Pat. No. 818,478, issued Apr. 24, 1906 (Shwayder);
U.S. Pat. No. 2,017,235, issued Oct. 15, 1935 (Drew);
U.S. Pat. No. 2,086,073, issued July 6, 1937 (Francescon)
U.S. Pat. No. 2,088,337, issued July 27, 1937 (Plume);
U.S. Pat. No. 2,108,661, issued Feb. 15, 1938 (Farrier et al.);
U.S. Pat. No. 2,132,435, issued Oct. 11, 1938 (Reiman);
U.S. Pat. No. 2,135,622, issued Nov. 8, 1938 (Nagle);
U.S. Pat. No. 2,196,193, issued Apr. 9, 1940 (Chambers et al.);
U.S. Pat. No. 2,663,745, issued Dec. 22, 1953 (Wilson);
U.S. Pat. No. 3,021,780, issued Feb. 20, 1962 (Bobbe);
U.S. Pat. No. 3,222,180, issued Dec. 7, 1965 (Sucietto);
U.S. Pat. No. 3,942,423, issued Mar. 9, 1976 (Herzfeld);
U.S. Pat. No. 4,073,955, issued Feb. 14, 1978 (Koppelman);
U.S. Pat. No. 4,173,656, issued Nov. 6, 1979 (Duggins);
U.S. Pat. No. 4,558,639, issued Dec. 17, 1985 (Hojnoski);
U.S. Pat. No. 4,576,824, issued Mar. 18, 1986 (Gubiev et al.).

In addition, other more exotic methods have been proposed, including subjecting the beverages to irradiation, ultrasonic scanning, microwaving and magnetization. Sometimes such a method may result in accelerated aging but within a few days the beverage may revert to its previous sensory qualities. Similarly, "biochemical" accelerated aging has been proposed utilizing bacteria, but liquor with an alcohol content higher than about 16 percent may be fatal to the bacteria.

Up to now, there is no known effective manner of greatly accelerating the aging process, particularly for alcoholic beverages of superior quality.

SUMMARY OF THE INVENTION

The principal object of the present invention is to provide mechanism and a method for accelerating aging of alcoholic beverages effectively by use of equipment of simple, inexpensive and durable construction and usable for a wide variety of alcoholic beverages.

In the preferred embodiment of the present invention, the foregoing objects are accomplished by confining the alcoholic beverage in a containment vessel of which the solid interior wall exposed to the beverage is formed of inorganic material, such vessel having internal interfacing elements with solid surfaces of inorganic material exposed to the beverage to increase the surface area of the solid-beverage interface. The solid surfaces to which the beverage is exposed are devoid of organic material. It is believed that the ongoing process of oxidation, reduction, polymerization, condensation and association of molecules occurs at the inorganic . . . solid-beverage . . . interface such that artificially increasing the surface area of such interface increases the rate at which the permanent change in the sensory qualities of the beverage occurs. At any rate, a marked change in the beverage has been observed equivalent to natural aging over a longer period of time.

DETAILED DESCRIPTION

The present invention utilizes a containment vessel for the alcoholic beverage to be artificially aged and internal interfacing elements for increasing the overall area of solid-liquid contact. The containment vessel can be of any convenient shape, but preferably is cylindrical for simplicity. The dimensions of the containment vessel depend primarily on the quantity of the batch of liquid it is desired to age. It is important that the interior surface of the containment vessel exposed to the alcoholic beverage be of inorganic material. Such material can be selected from glass, stone, ceramic, enamel, cement or metal suitable for containing edible liquids with high stability and without introducing impurities. Organic materials, especially woody materials, are strictly avoided.

Figure 1:
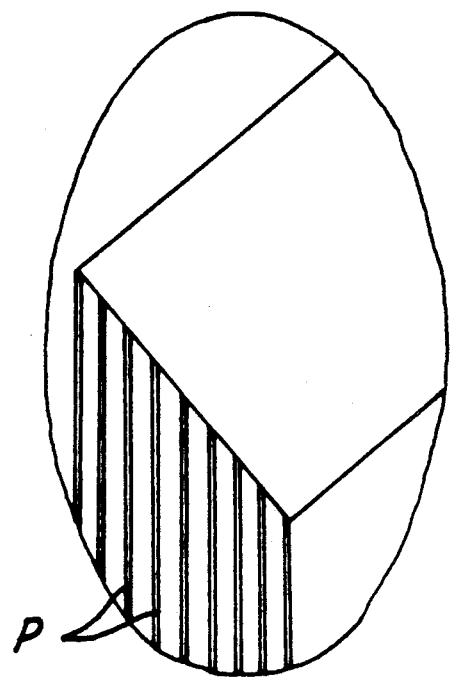
FIG. 1 is a diagrammatic representation of a first type of interfacing element usable in the method and mechanism of aging alcoholic beverages in accordance with the present invention.
Figure 2:
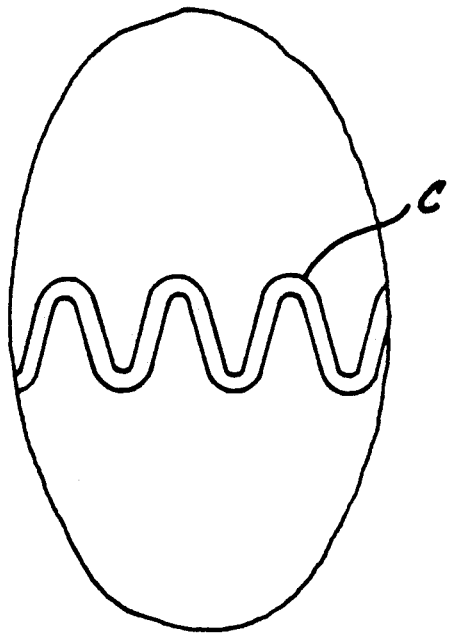
FIG. 2 is a diagrammatic illustration of a second form of such interfacing elements and FIG. 3 is a schematic representation of additional forms of interfacing elements.
Figure 3:
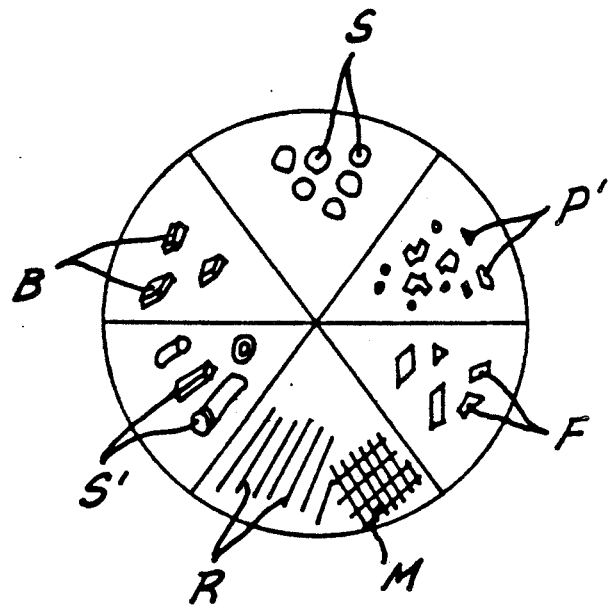

In order to increase the contact surface area between the liquid alcoholic beverage and inorganic solids, the containment vessel is provided with internal interfacing elements of inorganic material. Such elements also are devoid of organic material. Such elements can be glass, stone, ceramic, enamel, cement or metal. The interfacing elements can be in the form of plates, cubes, slabs, wires, nets, ribbons, tubes, rings, spheres or of irregular shapes. FIG. 1 illustrates schematically a network of spaced plates P which can be located in the containment vessel. FIG. 2 illustrates schematically the shape of an internal coil C which can be placed in the containment vessel; or the alcoholic beverage could be recirculated through the tube or coil C to increase the contact of the molecules of the alcoholic beverage with the solid inorganic interior surface of the coil. The coil can contain other inorganic interfacing elements. The shape shown in FIG. 2 also could be the cross-sectional shape of a serpentine or corrugated interfacing plate disposed in the containment vessel. FIG. 3 illustrates schematically alternative forms and shapes for the internal interfacing elements of inorganic materials including rods R, screen or mesh M, blocks B, balls or spheres S, irregularly shaped bits of flat plate material F, particulate material P' or irregularly shaped three-dimensional sections S'.

To accelerate the artificial aging, the interfacing elements can be moved or vibrated or the alcoholic beverage can be pumped, stirred or agitated. The object is to increase contact or collision of the molecules of alcoholic beverage with the interfacing elements. In addition, electrodes can be inserted in the containment vessel or the vessel itself be provided with metallic parts for application of voltage up to 200,000 volts for achieving a current flow of 0.1 microampere to 1 ampere between the electrodes.

Figure 4:
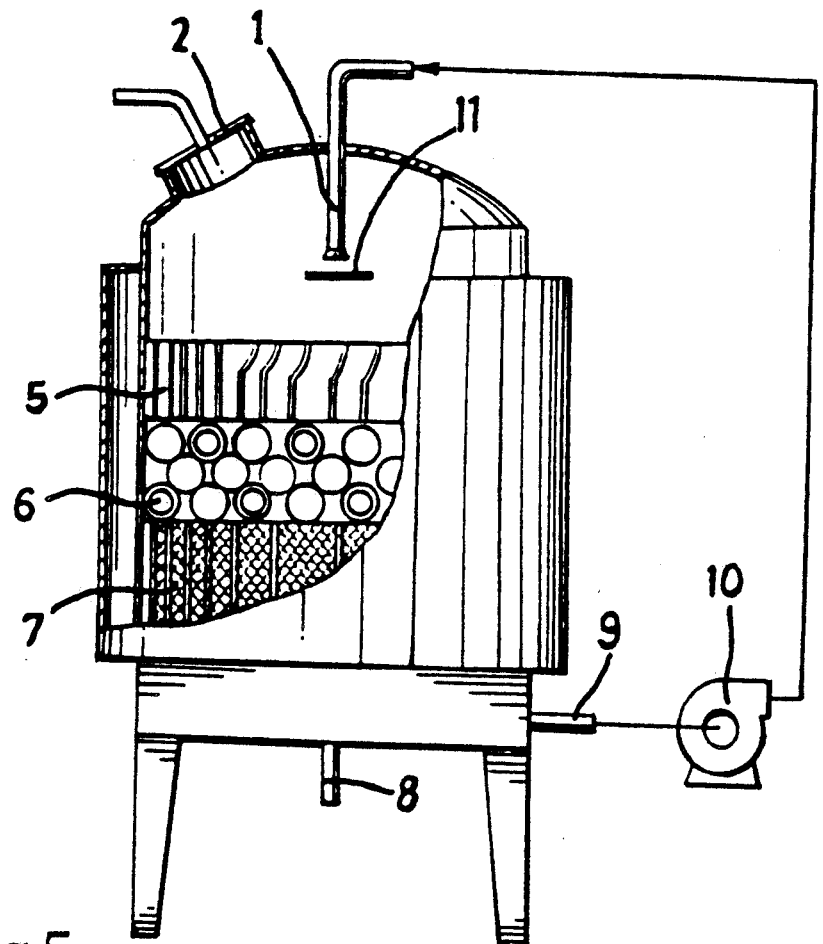
FIG. 4 is a somewhat diagrammatic side elevation of mechanism for accelerated aging of alcoholic beverages in accordance with the present invention, with parts broken away.

In the embodiment shown in FIG. 4, newly distilled alcoholic beverage can be sprayed into a metal containment vessel through a spray nozzle 1 onto a spattering plate 11. The inner surface of the containment vessel can be coated with a layer of glass or enamel. The alcoholic beverage will flow between and over layers 5, 6 and 7 of internal interfacing elements. Layer 5 can be spaced plates, layer 6 can be stacked balls, spheres or cylinders or a combination of the same and layer 7 can be wire screens or corrugated plates. Different inorganic materials can be used for the successive layers, such as glass, enameled metal and ceramic for layers 5, 6 and 7, respectively. After passing successively through the layers of interfacing elements, the alcoholic beverage can be discharged through a spout 9 and recirculated back to the spray nozzle by a pump 10. When the accelerated aging has progressed to the desired state, the alcoholic beverage can be removed and any remaining scum can be discharged through a drainage pipe 8. A manhole 2 is provided for access to the interior of the containment vessel for cleaning.

The alcoholic beverage may be sensitive to changes in temperature such that it may be desired to maintain a uniform temperature within the containment vessel. In the embodiment illustrated in FIG. 4, the containment vessel is of double-wall construction and mechanism can be provided for introducing a heat-transfer fluid between the interior and external walls or heating elements can be installed between such walls to maintain a desired temperature.

Figure 5:
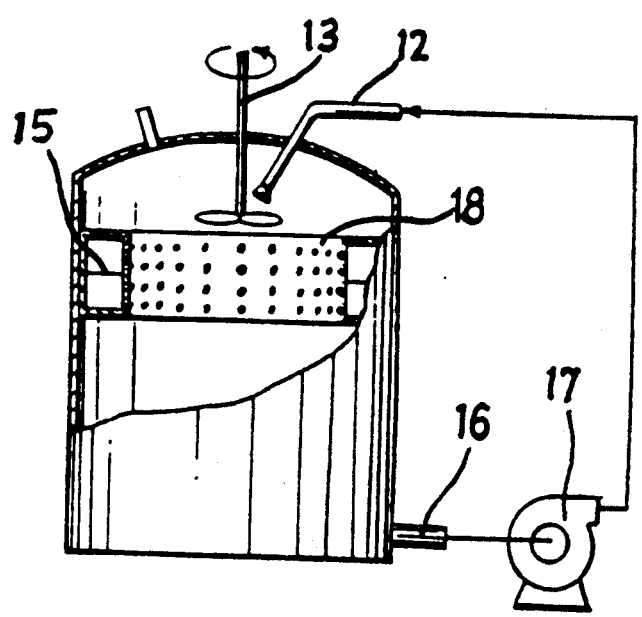
FIG. 5 is a side elevation of a modified form of apparatus for accelerated aging of alcoholic beverages in accordance with the present invention, with parts broken away.
Figure 6:
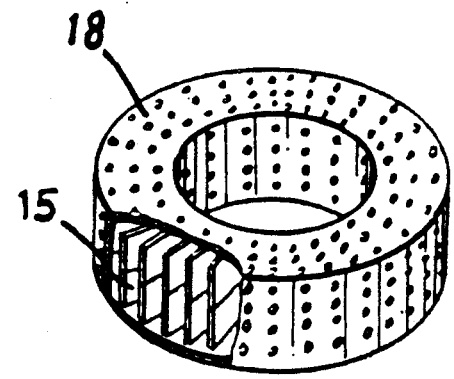
FIG. 6 is a top perspective of a component of the apparatus of FIG. 5, with parts broken away.

In the embodiment shown in FIG. 5 and FIG. 6, the generally cylindrical containment vessel has an internal surface exposed to the alcoholic beverage formed of inorganic material, as described above. A rotating bladed member 13 is provided onto which the alcoholic beverage can be sprayed through the inlet pipe 12. Member 13 spatters the beverage outward onto the flat top of an annular internal interfacing element. As best seen in FIG. 6, all sides of such annular element 18 have perforations for the passage of the alcoholic beverage into and out of element 18. The interior of element 18 can have closely spaced plates 15 of inorganic material. Alternatively, the element 18 can be filled with particulate interfacing elements or elements of the type previously described. With reference to FIG. 5, an outlet pipe 16 at the bottom is provided for discharge of the alcoholic beverage which can be recirculated by a pump 17 back to the inlet 12.

Treating an alcoholic beverage by means of the method and mechanism of the present invention has essentially the same effect as natural aging but requires a much shorter period of time. Both the sensory organ and physicochemical changes induced are essentially the same as for natural aging and the effects have been found to be reliable and stable over a long period with n reversion having been found.

I claim:

1. The method of aging an alcoholic beverage which comprises confining the beverage in a containment vessel having solid interior wall portions of inorganic material exposed to the beverage, such vessel including internal interfacing elements separate from such wall portions and having solid surfaces of inorganic material exposed to the beverage for increasing the surface area of the solid-beverage interface in the containment vessel, without exposing the alcoholic beverage to organic material.

2. The method defined in claim 1, in which the solid surfaces of the interfacing elements exposed to the beverage are glass.

3. The method defined in claim 1, in which the solid surfaces of the interfacing elements exposed to the beverage are stone.

4. The method defined in claim 1, in which the solid surfaces of the interfacing elements exposed to the beverage are ceramic material.

5. The method defined in claim 1, in which the solid surfaces of the interfacing elements exposed to the beverage are enamel material.

6. The method defined in claim 1, in which the solid surfaces of the interfacing elements exposed to the beverage are cement.

7. The method defined in claim 1, in which the solid surfaces of the interfacing elements exposed to the beverage are metal.

8. The method defined in claim 1, in which the interior surface of the containment vessel exposed to the beverage is selected from the group consisting of glass, stone, ceramic, enamel, cement and metal.

9. The method of aging an alcoholic beverage which comprises confining the beverage in a containment vessel having solid interior wall portions of inorganic material exposed to the beverage, such vessel including internal interfacing elements separate from such wall portions and having solid surfaces of inorganic material exposed to the beverage for increasing the surface area of the solid-beverage interface in the containment vessel, and agitating the beverage in the containment vessel, without exposing the alcoholic beverage to organic material.

10. The method of aging an alcoholic beverage which comprises confining the beverage in a containment vessel having solid interior wall portions of inorganic material exposed to the beverage, such vessel including internal interfacing elements separate from such wall portions and having solid surfaces of inorganic material exposed to the beverage for increasing the surface area of the solid-beverage interface in the containment vessel, and recirculating the beverage over the interfacing elements, without exposing the alcoholic beverage to organic material.

11. The method of aging an alcoholic beverage which comprises confining the beverage in a containment vessel having solid interior wall portions of inorganic material exposed to the beverage, such vessel including tubular internal interfacing elements separate from such wall portions and having solid surfaces of inorganic material exposed to the beverage for increasing the surface area of the solid-beverage interface in the containment vessel, and including pumping the beverage through the tubular interfacing elements, without exposing the alcoholic beverage to organic material.

12. The method of aging an alcoholic beverage which comprises confining the beverage in a containment vessel having solid interior wall portions or inorganic material exposed to the beverage, such vessel including internal interfacing elements separate from such wall portions and having solid surfaces of inorganic material exposed to the beverage for increasing the surface area of the solid-beverage interface in the containment vessel, and adjusting the temperature of the alcoholic beverage, without exposing the alcoholic beverage to organic material.

13. The method of aging an alcoholic beverage which comprises confining the beverage in a containment vessel having solid interior wall portions of inorganic material exposed to the beverage, such vessel including internal interfacing elements separate from such wall portions and having solid surfaces of inorganic material exposed to the beverage for increasing the surface area of the solid-beverage interface in the containment vessel, and adjusting the temperature of the alcoholic beverage by heat exchange adjacent to the wall of the containment vessel, without exposing the alcoholic beverage to organic material.

14. The method of aging an alcoholic beverage which comprises confining the beverage in a containment vessel having solid interior wall portions of inorganic material exposed to the beverage, such vessel including internal interfacing elements separate from such wall portions and having solid surfaces of inorganic material exposed to the beverage for increasing the surface area of the solid-beverage interface in the containment vessel, without exposing the alcoholic beverage to organic material, and including introducing the alcoholic beverage into the containment vessel by spraying the beverage through a nozzle.

15. The method defined in claim 14, including spraying the alcoholic beverage onto a spatter plate.

16. The method defined in claim 14, including spraying the alcoholic beverage onto a rotating member of inorganic material.

* * * * *